(12) United States Patent
Strnad et al.

(10) Patent No.: US 12,147,021 B2
(45) Date of Patent: *Nov. 19, 2024

(54) MICROSCOPE, METHOD OF OPERATING A MICROSCOPE AND METHOD OF IMAGING A SAMPLE

(71) Applicant: VIVENTIS MICROSCOPY SÀRL, Lausanne (CH)

(72) Inventors: Petr Strnad, Lausanne (CH); Andrea Boni, Basel (CH)

(73) Assignee: VIVENTIS MICROSCOPY SÀRL, Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,572

(22) Filed: Jan. 10, 2023

(65) Prior Publication Data

US 2023/0161142 A1    May 25, 2023

Related U.S. Application Data

(63) Continuation of application No. 16/632,074, filed as application No. PCT/EP2018/069733 on Jul. 20, 2018, now Pat. No. 11,579,428.

(30) Foreign Application Priority Data

Jul. 20, 2017   (CH) ..................................... 00946/17

(51) Int. Cl.
   *H04N 9/47*    (2006.01)
   *G02B 21/00*   (2006.01)
   (Continued)

(52) U.S. Cl.
   CPC ..... *G02B 21/0032* (2013.01); *G02B 21/0048* (2013.01); *G02B 21/26* (2013.01);
   (Continued)

(58) Field of Classification Search
   USPC ......................................................... 348/79
   See application file for complete search history.

(56) References Cited

U.S. PATENT DOCUMENTS

| 5,381,016 A | 1/1995 | Moriya |
| 7,554,725 B2 | 6/2009 | Stelzer et al. |

(Continued)

FOREIGN PATENT DOCUMENTS

| CN | 104155274 B | 11/2016 |
| CN | 106053346 B | 6/2018 |

(Continued)

OTHER PUBLICATIONS

International Search Report dated Oct. 19, 2018 in corresponding International Appln. No. PCT/EP2018/069733.

(Continued)

*Primary Examiner* — Nigar Chowdhury
(74) *Attorney, Agent, or Firm* — Frost Brown Todd LLP (57) ABSTRACT

A microscope for imaging a sample is disclosed that may include at least one illumination objective arranged to eject an illumination light beam along an illumination path to illuminate the sample; an imaging objective arranged to receive detection light including at least a portion of the light ejected from the sample, wherein the detection light is propagated along a detection axis and the imaging objective has an imaging focal plane; an adjustment arrangement to linearly displace the illumination light beam and the imaging focal plane relative to each other along the detection axis; a sample holder arranged to receive a sample and having a portion which is transparent to the illumination light beam and to the detection light; and a holder support arranged to receive the sample holder and displace the sample holder relative to the imaging objective such that the imaging focal plane is positioned inside the sample holder.

18 Claims, 2 Drawing Sheets

(51) Int. Cl.
   *G02B 21/26* (2006.01)
   *G02B 21/33* (2006.01)
   *H04N 23/54* (2023.01)
   *H04N 23/55* (2023.01)
   *H04N 23/56* (2023.01)
   *H04N 23/75* (2023.01)
   *H04N 7/18* (2006.01)

(52) U.S. Cl.
   CPC ............. *G02B 21/33* (2013.01); *H04N 23/54* (2023.01); *H04N 23/55* (2023.01); *H04N 23/56* (2023.01); *H04N 23/75* (2023.01)

(56) References Cited

U.S. PATENT DOCUMENTS

| | | |
|---|---|---|
| 8,547,634 B2 | 10/2013 | Power et al. |
| 8,970,950 B2 | 3/2015 | Stelzer |
| 9,134,521 B2 | 9/2015 | Huisken |
| 9,404,869 B2 | 8/2016 | Keller |
| 9,880,378 B2 | 1/2018 | Taniguchi et al. |
| 10,168,519 B2 | 1/2019 | Rondeau |
| 10,222,601 B2 | 3/2019 | Taniguchi et al. |
| 10,288,861 B2 | 5/2019 | Shimada |
| 10,684,457 B2 | 6/2020 | Dohi et al. |
| 10,712,547 B2 | 7/2020 | Taniguchi et al. |
| 10,718,932 B2 | 7/2020 | Yang |
| 10,802,262 B2 | 10/2020 | Tomer et al. |
| 10,983,320 B2 | 4/2021 | Hufnagel et al. |
| 10,983,322 B2 | 4/2021 | Kalkbrenner et al. |
| 10,989,661 B2 | 4/2021 | Fiolka et al. |
| 11,385,451 B2 | 7/2022 | Hedde et al. |
| 11,422,347 B2 | 8/2022 | Anhut et al. |
| 11,703,670 B2 | 7/2023 | Anhut et al. |
| 2002/0076184 A1 | 6/2002 | Iyoki |
| 2006/0033987 A1 | 2/2006 | Stelzer |
| 2006/0066942 A1 | 3/2006 | Kouno et al. |
| 2009/0203536 A1 | 8/2009 | Vermette |
| 2010/0067104 A1 | 3/2010 | Lippert et al. |
| 2010/0309548 A1 | 12/2010 | Power et al. |
| 2011/0043607 A1* | 2/2011 | Grier .................. G01N 15/0227 356/450 |
| 2011/0096967 A1* | 4/2011 | Oda .................. G01N 21/6456 250/227.24 |
| 2011/0259744 A1* | 10/2011 | Moyle .............. G01N 27/44726 204/461 |
| 2012/0281264 A1 | 11/2012 | Lippert et al. |
| 2013/0094755 A1 | 4/2013 | Lippert et al. |
| 2015/0286042 A1 | 10/2015 | Hilbert et al. |
| 2016/0070091 A1 | 3/2016 | Hufnagel |
| 2016/0377544 A1* | 12/2016 | Hoogenboom .... G01N 21/6428 250/459.1 |
| 2016/0377852 A1* | 12/2016 | Hufnagel ............... G02B 21/06 359/385 |
| 2017/0003489 A1* | 1/2017 | Steinborn ............ G02B 21/245 |
| 2017/0010369 A1* | 1/2017 | Barrett .................. G01T 1/2942 |
| 2017/0075101 A1 | 3/2017 | Hawes |
| 2017/0090176 A1 | 3/2017 | Pospiech |
| 2018/0101000 A1 | 4/2018 | Yang |
| 2020/0379232 A1* | 12/2020 | Feirer .................. G02B 21/244 |
| 2020/0386977 A1* | 12/2020 | Salili .................. G02B 21/0032 |
| 2021/0011001 A1* | 1/2021 | Chou ....................... B01L 3/508 |
| 2021/0018408 A1* | 1/2021 | Dobosz .................... G01N 1/34 |
| 2021/0033838 A1* | 2/2021 | Glaser .................. G02B 27/425 |

FOREIGN PATENT DOCUMENTS

| | | |
|---|---|---|
| CN | 109596588 B | 10/2021 |
| DE | 10 2007 015061 A1 | 10/2008 |
| DE | 10 2007 045897 A1 | 4/2009 |
| DE | 10 2007 047461 A1 | 4/2009 |
| DE | 10 2009 044984 A1 | 3/2011 |
| DE | 102022200841 B3 | 5/2023 |
| DE | 102014104977 B4 | 11/2023 |
| EP | 2 801 855 A1 | 11/2014 |
| EP | 3264153 B1 | 5/2019 |
| EP | 3304167 B1 | 4/2021 |
| EP | 2829903 B1 | 9/2021 |
| JP | 6522361 B2 | 5/2019 |
| JP | 6685202 B2 | 4/2020 |
| JP | 7085364 B2 | 6/2022 |
| WO | WO 2007/124437 A2 | 11/2007 |
| WO | WO 2011/036096 A1 | 3/2011 |
| WO | 2014026683 A1 | 2/2014 |
| WO | 2014056992 A1 | 4/2014 |
| WO | WO 2014/180884 A1 | 11/2014 |
| WO | WO 2015/004107 A1 | 1/2015 |
| WO | WO 2015/036589 A1 | 3/2015 |
| WO | 2017075275 A1 | 5/2017 |
| WO | WO 2021/183945 A1 | 9/2021 |
| WO | WO 2023/017181 A1 | 2/2023 |

OTHER PUBLICATIONS

Communication Pursuant to Article 94(3) EPC dated Jul. 14, 2022 in corresponding EP Appl. No. 18 749 735.9.
Cole, M. J., et al. "Time-domain whole-field fluorescence lifetime imaging with optical sectioning." *Journal of Microscopy* 203.3 (2001): 246-257.
Greger, K., J. Swoger, and E. H. K. Stelzer. "Basic building units and properties of a fluorescence single plane illumination microscope." *Review of Scientific Instruments* 78.2 (2007).
Keller, Philipp J., Francesco Pampaloni, and Ernst HK Stelzer. "Three-dimensional preparation and imaging reveal intrinsic microtubule properties." *Nature Methods* 4.10 (2007); 843-846.
Wohland, Thorsten, et al. "Single plane illumination fluorescence correlation spectroscopy (SPIM-FCS) probes inhomogeneous three-dimensional environments." *Optics express* 18.10 (2010): 10627-10641.

* cited by examiner

MICROSCOPE, METHOD OF OPERATING A MICROSCOPE AND METHOD OF IMAGING A SAMPLE

CROSS-REFERENCE TO RELATED APPLICATIONS

The present application is a continuation of prior application U.S. application Ser. No. 16/632,074, having a 371(c) date of Jan. 17, 2020, which is a national phase application of PCT/EP2018/069733, filed Jul. 20, 2018, which claims priority to CH 00946/17, filed Jul. 20, 2017, each of which is incorporated by reference herein in its entirety.

TECHNICAL FIELD

The present invention relates to a microscope and more particularly to a method of operating a microscope, a method of imaging a sample and a computer program for operating a microscope. Such a microscope with at least one illumination objective arranged to eject an illumination light beam along an illumination path to illuminate a sample, and an imaging objective arranged to receive detection light comprising at least a portion of the light ejected from the sample, can be used for imaging and analysing the sample.

BACKGROUND

Light Sheet (LS) or Selective Plane Illumination Microscopy (SPIM) is a fluorescence microscopy method in which an illumination beam path (excitation light) and a detection beam path (emission light from the sample) are substantially perpendicular to each other. The sample is placed at an intersection of these paths in a focal plane of the imaging objective. For optimal image quality and optical sectioning, the illumination light sheet must be positioned to precisely intersect the focal plane of the imaging objective.

In some SPIM embodiments, hereafter referred to as inverted SPIM arrangements, the illumination and imaging objective are placed below a sample holder having a transparent bottom. A main advantage of the inverted SPIM arrangement is that a plurality of samples can be imaged in parallel and the samples are kept separated from an immersion medium and the objectives. In one such embodiment described in EP 2 801 855 A1, the illumination and imaging objectives are immersed in an immersion medium (typically water) with a refractive index substantially similar to the transparent bottom of the sample holder and the culture medium to minimize optical aberrations. However, this is often not possible because many biological samples grow in medium, gel or matrix with a refractive index different from the one of water. Because of the non-orthogonal angle of incidence of the illumination light and the transparent bottom of the sample holder the illumination beam might be refracted in such medium, preventing the illumination beam to intersect the imaging objective's focal plane and degrading image quality. In another inverted SPIM arrangement, described in WO 2015/036589 A1, a cuvette with transparent walls orthogonal to the illumination and detection beam path is used to minimize optical aberrations. Although this minimizes the refraction of the illumination beam, such cuvette is constrained in its shape, may be more difficult to manufacture and may limit the observable area with good image quality. Moreover, current inverted SPIM arrangements use single illumination and imaging objective. In this objective arrangement shadows behind absorbing or scattering parts of the sample deteriorate the quality of the imaging, which particularly can be critical for optically dense samples and/or samples larger than 100 µm in diameter.

Therefore, there is a need for a system allowing for an efficient and precise microscopic or SPIM imaging of a sample.

DISCLOSURE OF THE INVENTION

According to the invention this need is settled by a microscope, a method of imaging a sample, a method of operating a microscope, and a computer program as described herein.

In particular, the invention deals with a microscope for imaging a sample comprising at least one illumination objective, an imaging objective, a motorized and electronically controlled adjustment arrangement, a sample holder and a holder support.

The at least one illumination objective is arranged to eject an illumination light beam along an illumination path to illuminate the sample. Thereby, the illumination light beam can be straight, redirected by suitable optical means or have any other appropriate form, particularly a form of a light sheet. It can be a laser light beam having a range of wavelengths adapted to the properties of the sample. In particular, the wavelength of the laser light beam can be suitable for excitation of fluorophores and fluorescence imaging.

The imaging objective is arranged to receive detection light comprising at least a portion of the light ejected from the sample. Thus, the light ejected from the sample can particularly comprise emitted fluorescence light or light ejected by the illumination objective and redirected or reflected by the sample. The detection light is propagated along a detection axis angled to the illumination path. The angle between the detection axis and the illumination path preferably is about 90°. The imaging objective has an imaging focal plane.

The term "focal plane" as used herein can relate to a plane perpendicular to an optical axis defined by a front focal point and a rear focal point of the imaging objective. The focal plane can represent the plane where light of the imaging objective is focused such as a plane in front of the objective imaged on the plane of a microscope camera chip.

The sample holder is arranged to receive the sample. It has a portion which is transparent to the illumination light beam and to the detection light. By means of the sample holder, the sample can be safely kept at an appropriate position. Like this, it can be precisely exposed to the illumination light beam. The imaging objective is positioned substantially below the sample holder. Thereby, the sample holder can conveniently be accessed, e.g., top down. This allows for manipulating the sample inside the sample holder or for replacing the sample holder in the holder support. Furthermore, the sample can be held in the sample holder only by gravity without the need for embedding in agarose or other support and multiple samples can be arranged next to each other.

The holder support is arranged to receive the sample holder and to displace the sample holder relative to the imaging objective such that the imaging focal plane is positioned inside the sample holder and at a position of interest. The holder support has a drive system arranged to displace the sample holder along three perpendicular axes and/or to rotate the sample holder around at least one rotation axis. Thereby, the holder support can be motorized. Like this, the sample holder can firmly be supported and located or relocated in order that the sample is precisely positioned for illumination and imaging. In particular, this allows to visit or address multiple positions of the sample automatically.

The adjustment arrangement is arranged to linearly displace the illumination light beam and the imaging focal plane relative to each other along the detection axis. Such displacement can be achieved by moving the illumination objective or adapting beam directing means such as mirrors of it. It can also be achieved by moving the imaging objective or by optical means behind the imaging objective. Combinations of moving the illumination objective, adapting the beam directing means, moving the imaging objective and optical means behind the imaging objective are possible.

The displacement created by the motorized adjustment arrangement can be achieved in less than 100 ms. It can be automatically triggered, e.g., by a software control, without the need of human intervention. Thereby, the displacement by the adjustment structure is used to align the illumination beam in order to intersect the focal plane of the imaging objective. Like this, the adjustment arrangement allows for appropriately illuminating different positions within the sample.

Intending to improve quality of microscopic or SPIM imaging it has been found in accordance with the invention that, due to a non-orthogonal angle of incidence of illumination light and transparent bottom of sample holder as present in some inverted SPIM arrangements, deviation of the illumination beam might happen, which prevents the illumination beam to intersect the imaging objective's focal plane and degrades image quality. This phenomenon is further amplified by the presence of culture medium or growth support matrix, such as agarose, matrigel or hydrogel, with a refractive index that deviates from the one of the immersion medium and sample holder bottom material. Since the degree of beam deflection is dependent of the distance that the light travels within the sample holder, this results in different positions inside the sample being illuminated by beams with different rotational and translational offsets. The illumination beam must therefore be independently realigned for each position inside the sample to obtain optimal image quality. Since the sample might move and/or grow during the acquisition time the realignment can also happen over time, albeit less frequently than imaging itself. Therefore, a disadvantage of some inverted SPIM arrangements is that, although multiple positions imaging is possible, practically only a fraction of them can be imaged with the desired image quality.

With the microscope according to the invention, however, the light sheet or illumination light beam can automatically be aligned and realigned at various different positions. The illumination light beam can also be automatically realigned when being moved along or through the sample. Thus, the microscope according to the invention may provide an inverted SPIM arrangement for imaging one single sample or a plurality of samples and allows for an efficient and precise microscopic or SPIM imaging of the one or more samples.

Furthermore, by means of the adjustment arrangement the light or the illumination light beam can be redirected and adapted in order to compensate for a deviation resulting from differing refractive indexes inside and outside the sample holder. In particular, such compensation can be important when the illumination light beam hits the sample holder at a non-perpendicular angle which may cause a misalignment if a medium surrounding the sample, i.e. inside the sample holder, has a different refractive index than a medium outside the sample holder. Thereby, the adjustment arrangement allows for properly aligning the illumination light beam such that the sample holder can be shaped essentially independent from any constraint and media with differing refractive indexes can be used.

Also, since generally within a sample different misalignments may occur when they are illuminated with light sheet deflected at different angles due to a non-perpendicular orientation of the illumination light beam relative to the sample holder, the adjustment arrangement makes suitable compensation possible. For some sort of samples this misalignment can even be amplified by the refractive index of a matrix or gel which is used to grow the sample. Thus, imaging the sample with the microscope according to the invention can be unimpaired by the shape of the sample holder or with light sheet at different positions within the sample holder, by the media used inside and outside the sample holder as well as by a matrix or gel with respect to their refractive indices.

Still further, the adjustment arrangement and sample holder combination of the microscope according to the inventions allows for imaging samples preferably illuminated from both sides and at the same time very close such as less than 400 μm or even less than 50 μm or 20 μm from the bottom of the sample holder or its transparent portion. This can increase accuracy of the imaging. In particular, when imaging samples embedded in a gel, matrix or medium with even slightly different refractive index from an immersion medium (typically water) it is essential to minimize the length the emitted light travels through such medium to minimize optical aberration. This can be achieved by imaging close the sample holder bottom. At that position, however, the illumination beam enters into the sample holder at a sharp angle such as, e.g. less than 40 degrees)(° or even less than 15° or less than 10°, which further amplifies light sheet misalignment. The adjustment arrangement can correct the misalignment and, thus, increase the accuracy of the imaging.

Preferably, the imaging objective is oriented upwards against the direction of gravity and the illumination and further illumination objectives are oriented preferably approximately horizontally. In this orientation the focal plane of the illumination objective is oriented horizontally and sample can be accessed, viewed and manipulated from top in a natural way by the user.

Preferably, the adjustment arrangement is embodied to change the displacement of the illumination light beam and of the imaging focal plane relative to each other along the detection axis in synchronization with changing positions of the sample. Like this, misalignments of the light sheet or illumination light beam due to changes of the position can automatically and efficiently be compensated.

Thereby, the adjustment arrangement preferably is motorized and electronically controlled. Like this, the adjustment arrangement can be operated automatically and rapidly without requiring any human intervention. For example, such a system allows for previously setting up an imaging process as it best suits the involved sample, whereas the imaging process itself is automatically executed.

Preferably, the microscope comprises a further illumination objective arranged to eject a further illumination light beam along a further illumination path, wherein the further illumination objective is arranged to eject the further illumination light beam substantially opposite to the illumination light beam, and the microscope comprises a further adjustment arrangement to linearly displace the further illumination light beam and the imaging focal plane relative to each other along the detection axis. Such a microscope allows for dual or plural sided illumination of the sample. Particularly, this can be essential for comparably large samples such as biological samples. For example, such illumination allows for reducing shadow effects in or on the sample impairing the quality of the imaging.

Thereby, the further adjustment arrangement preferably is configured to linearly displace the further illumination light beam and the imaging focal plane relative to each other along the detection axis independently from the relative displacement between the illumination light beam and the imaging focal plane along the detection axis. Such arrangement allows for a precise alignment of both illumination beams at the same time and, therefore, for increasing imaging quality.

Preferably, the transparent portion of the sample holder tapers along the detection axis. Thereby, the tapering transparent portion can have a rounded bottom. Such tapering transparent portion allows for exposing the sample to the illumination light beam from both sides. In particular, the sample can be efficiently illuminated in a comparably complete manner. Furthermore, such a tapering sample holder can be efficiently manufactured of various suitable materials. When being equipped with a sample holder having the tapering portion the illumination light beam usually hits the sample holder at various non-perpendicular angles which can efficiently be compensated by the adjustment arrangement of the microscope according to the invention. Thus, when such a sample holder is used, the adjustments arrangement of the microscope can be particularly beneficial.

Preferably, the illumination objective and/or the further illumination objective and the imaging objective are configured to remain at respective fixed locations, and the adjustment arrangement and/or the further adjustment arrangement are spatially offset from the objectives.

Preferably, the adjustment arrangement is located behind the illumination objective and determines a movement of the illumination light beam along the detection axis. In this connection, the term "behind" relates to a direction of propagation of the illumination light beam. In particular, when the adjustment arrangement is behind the illumination objective, the illumination light beam first travels through or by the adjustment arrangement and then through or by the illumination optics. Such embodiment allows for efficiently aligning the illumination light beam and for providing a comparably robust setup.

Preferably, the adjustment arrangement essentially consists of optical components. Such optical components can be elements like mirrors, reflectors, lenses and the like. In particular, the adjustment arrangement preferably comprises at least one mirror or at least two mirrors. By using optical elements, the adjustment arrangement can quickly and precisely align or realign the illumination light beam. For example, the illumination light beam can be (re) aligned within 100 ms.

When comprising at least two mirrors in the adjustment arrangement, they preferably are arranged to move relative to each other in a way that an alignment of the illumination light beam is achieved. Such an embodiment allows for efficiently implementing the adjustment arrangement.

Preferably, the microscope comprises a rotative arrangement to rotationally displace the illumination light beam in a rotation plane in which the detection axis lies or which is defined by the detection axis and the illumination path. By providing the rotative arrangement, the light or the illumination light beam can be redirected and adapted. This, may improve the effects achieved by the adjustment arrangement such as compensation for a deviation resulting from differing refractive indexes.

Preferably, the rotative arrangement essentially consists of optical components which can comprise at least one mirror or two mirrors. Thereby, the at least one mirror or two mirrors of the rotative arrangement preferably correspond to the at least one mirror or two mirrors of the adjustment arrangement. Such rotative arrangement can be efficiently implemented and requires comparably few space. Also, it allows for quickly and precisely adjusting and aligning the illumination light beam.

Preferably, the further illumination objective is substantially identical to the illumination objective. Additionally or alternatively, the further adjustment arrangement preferably is substantially identical to the adjustment arrangement. Such embodiments allow for a precise imaging with dual side illumination.

Preferably, the illuminating objective and the imaging objective are placed in an immersion medium. Furthermore, the transparent portion of the sample holder preferably is made of a material which has a refractive index corresponding to a refractive index of the immersion medium. The transparent portion of the sample holder can also be made of a material with a refractive index substantially corresponding to a refractive index of a medium to be arranged inside the sample holder. Such embodiments allow for minimizing or eliminating deviations due to different refractive indexes and, thus, to improve the imaging quality.

Thereby, the immersion medium preferably is water or a water solution. The transparent portion of the sample holder preferably is a membrane made of fluorinated ethylene propylene and preferably of a thickness in a range of between about 10 μm to about 100 μm such as, e.g., 25 μm. Such material has a refractive index being essentially the same as the refractive index of water or water solutions.

Preferably, the sample comprises or is arranged in a sample medium having a refractive index different from the refractive index of the immersion medium. Such a sample medium can allow an appropriate handling and arrangement of the sample in particular when being a biological sample. When having an immersion medium and a sample medium with differing refractive indexes, the adjustment arrangement according to the invention can be particularly beneficial.

Preferably, the imaging objective is positioned to be directed essentially against a direction of gravity and the at least one illumination objective is positioned to be directed essentially perpendicular to the direction of gravity.

Another aspect of the invention relates to a method of imaging a sample (imaging method) comprising the steps of: illuminating the sample with an illumination light beam ejected along an illumination path; an imaging objective having an imaging focal plane, detecting light ejected from the sample along a detection path angled preferably at about 90° to the illumination path wherein the detection light comprises at least a portion of the light ejected from the sample; and displacing the illumination light beam and the imaging focal plane relative to each other along the detection path. The imaging method and its preferred embodiments allow for achieving the effects and benefits described above in connection with the microscope according to the invention and it preferred embodiments.

Thereby, the imaging method preferably comprises the step of changing the displacement of the illumination light beam and of the imaging focal plane relative to each other along the detection axis in accordance with changing positions of the sample. Changing positions of the sample preferably comprises displacing the sample along at least two of three perpendicular axes and/or to rotate the sample around a rotation axis.

Preferably, by displacing the illumination light beam and the imaging focal plane relative to each other along the detection path, the illumination light beam is brought in an alignment such that it intersects the imaging focal plane; and wherein the sample is imaged in a given position for a set of alignments of the illumination beam. Thereby, the imaging method preferably comprises a step of taking an image of the sample for each of the set of alignments of the illumination beam; a step of evaluating the images taken based on contrast or other image quality features to determine best alignment parameters for the given position of the sample; a step of storing best alignment parameters; and a step of displacing the illumination light beam in compliance with the stored best alignment parameters.

Another further aspect of the invention relates to a method of operating a microscope as described above (operating method), comprising the steps of: arranging a sample inside a sample holder of the microscope; an illumination objective of the microscope illuminating the sample with an illumination light beam ejected along an illumination path, through a transparent portion of the sample holder; an imaging objective having an imaging focal plane receiving detection light comprising at least a portion of the light ejected by the sample, wherein the detection light is propagated along a detection path essentially orthogonal to the illumination path and defining a detection axis; and displacing the illumination light beam and the imaging focal plane relative to each other along the detection axis. The operating method and its preferred embodiments allow for achieving the effects and benefits described above in connection with the microscope according to the invention and its preferred embodiments.

The operating method preferably further comprises a step of changing the displacement of the illumination light beam relative to the imaging focal plane along the detection axis based on a position of the sample or on a position of a portion thereof in the sample holder.

Preferably, the operating method comprises a step of displacing the sample holder along at least two of three perpendicular axes and/or a step of rotating the sample holder around at least a rotation axis, by way of a drive system of a holder support.

Preferably, the operating method comprises a step of rotationally displacing the illumination light beam in a rotational plane in which the detection axis lies.

In the operating method, the transparent portion of the sample holder preferably tapers along the detection axis and the illumination light beam is arranged to impinge the sample holder at a sharp angle.

Still another further aspect of the invention relates to a computer program for operating a microscope as descried above. The computer program and its preferred embodiments allow for achieving the effects and benefits described above in connection with the microscope according to the invention and its preferred embodiments.

Thereby, the computer program preferably has a code structure arranged for implementing the operating method according to the invention when being executed on a computer.

BRIEF DESCRIPTION OF THE DRAWINGS

The microscope and the methods according to the invention are described in more detail herein below by way of exemplary embodiments and with reference to the attached drawings.

DETAILED DESCRIPTION OF EMBODIMENTS

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
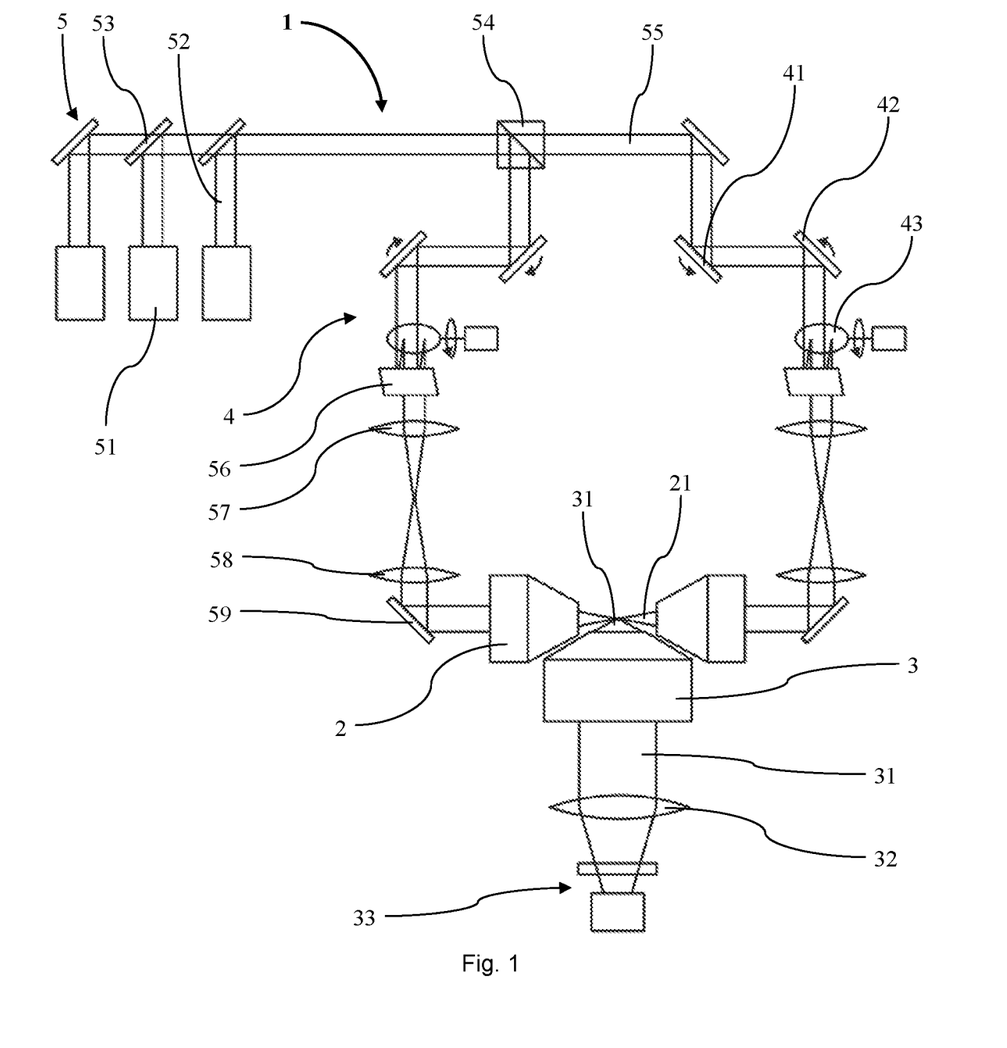
FIG. 1 shows a schematic overview of an embodiment of a microscope according to the invention for being used in an embodiment of an operating method according to the invention

FIG. 1 shows an embodiment of a microscope 1 according to the invention. It comprises a beam generator 5 equipped with an adjustment/rotative arrangement 4 (ARA) as a combination of an adjustment arrangement and a rotative arrangement. The beam generator 5 has three laser sources 51 ejecting light towards associated mirrors and dichroic mirrors 53. In particular, the ejected light 52 of the laser sources 51 is accumulated by the accumulating and dichroic mirrors 53 to a common light beam.

The common light beam is directed to a beam splitter 54 which generates a light beam 55 and a deflected further light beam 55. The light beam 55 and the further light beam 55 are correspondingly processed by respective symmetrically arranged mirror components. For matter of simplicity, in the following only the travel of the light beam 55 is mentioned. However, it is understood that the same also applies to the further light beam 55.

The light beam 55 is directed to the ARA 4, which comprises mirror symmetrically arranged two first rotatable mirrors 41, two second rotatable mirrors 42 and two third rotatable mirrors 43. In particular, the light beam 55 is directed to the first rotatable mirror 41, which redirects it towards the second rotatable mirror 42, which redirects it through a fixed mirror 56 towards the third rotatable mirror 43. The first rotatable mirror 41 and the second rotatable mirror 42 can be pivoted about parallel axes in a single plane. By adjusting the rotational position of the first rotatable mirror 41 the location where the light beam 55 hits the second rotatable mirror 42 can be defined. By adjusting the rotational position of the second rotatable mirror 42 the location where the light beam 55 hits the third rotatable mirror 43 can be defined. This allows displacing and rotating the light beam 55 in first plane.

The third rotatable mirror 43 can be pivoted about an axis perpendicular to the axes of the first and second rotatable mirrors 41, 42. By adjusting the rotational position of the third rotatable mirror 43 the light beam 55 can be displaced in a second plane orthogonal to the plane in which the light beam 55 is displaceable by the first and second rotatable mirrors 41, 42. In particular, the third rotatable mirror 43 can be a mirror galvanometer scanner which allows for a fast beam movement within the exposure time to generate light sheet.

From the third rotatable mirror 43, the light beam 55 is provided to a focusing lens 57 and a collimating lens 58. The third rotatable mirror 43 is placed at the focus of the lens 57. The light beam 55 is then directed by a final mirror 59 to an illumination objective 2. The illumination objective 2 then ejects a focused illumination light beam 21 generated from the light beam 55 along an illumination path 22 (not shown in FIG. 1).

Since the optical system described above is mirror symmetrically set up in duplicate, there are two illumination objectives 2 opposite to each other. They both eject the illumination light beams 21 towards each other along the illumination path 22. Like this, the illumination light beams 21 illuminate a sample 61 (not visible in FIG. 1) from two opposite sides. The sample 61 emits detection light and part of it is collected by an imaging objective 3 having an imaging focal plane 34 (not visible in FIG. 1). Thus, it ejects detection light 31 propagated along a detection axis 35 (not shown in FIG. 1) angled at 90° to the illumination path 22. The imaging objective 3 gathers the detection light 31 and provides it via a focusing lens 32 to a detector 33 comprising an emission filter and a camera.

In the context of the description of the FIGS. the term "sample" or "sample medium" can relate to a single sample, a plurality of samples, to a medium being the sample itself or to a sample mixed or placed in a medium.

Figure 2:
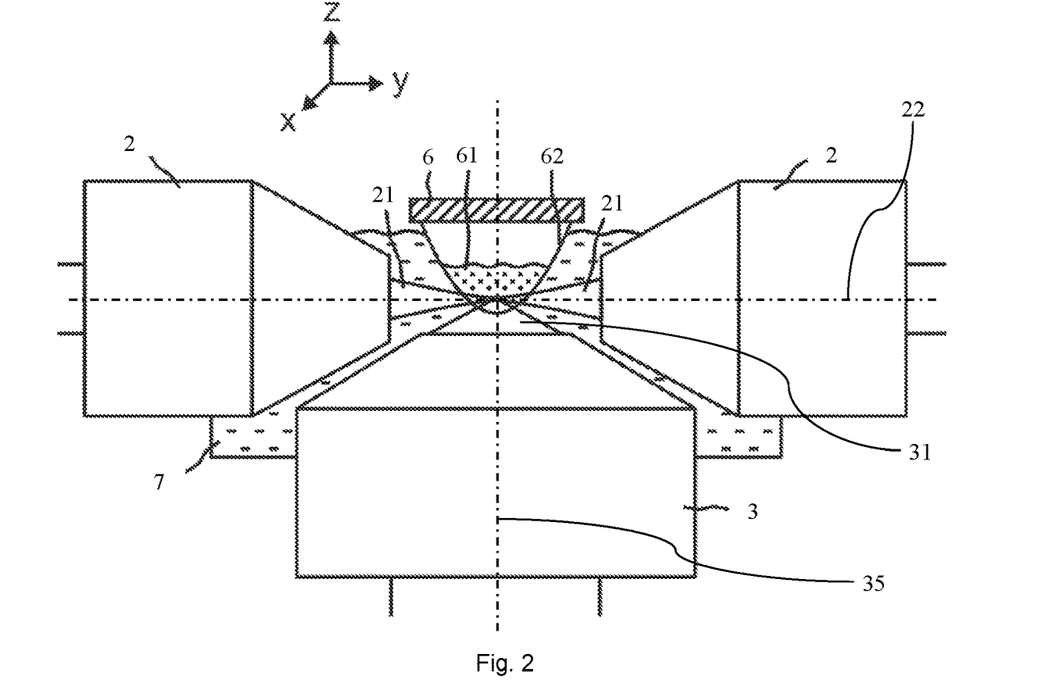
FIG. 2 shows a section of the microscope of FIG. 1.

In FIG. 2 a section of the microscope 1 is shown in more detail. Thereby, it can be seen that centrally between the two illumination objectives 2 a sample holder 6 is positioned. The sample holder 6 tapers downwardly and has a rounded bottom. The tapering section and the rounded bottom form a transparent portion 62. In particular, the transparent portion 62 is transparent for the illumination light beams 21 propagated along the illumination path 22 and the detection light 31.

The imaging objective 3 is arranged below sample holder 6 and the illumination objectives 2. Its orientation is perpendicular to the orientation of the illumination objectives 2.

The imaging objective 3 and the illumination objectives 2 are placed in an immersion medium 7. The sample holder 6 is carried by a holder support (not visible in FIG. 2) which allows for moving the complete sample holder 6. It further has an interior which is open in an upward direction. In the sample holder 6 the sample medium 61 containing the sample is arranged. In particular, the sample holder 6 is closed in a downward direction, i.e. in a direction of gravity, such that the sample medium 61 is held inside the sample holder 6 by means of the gravity.

Figure 3:
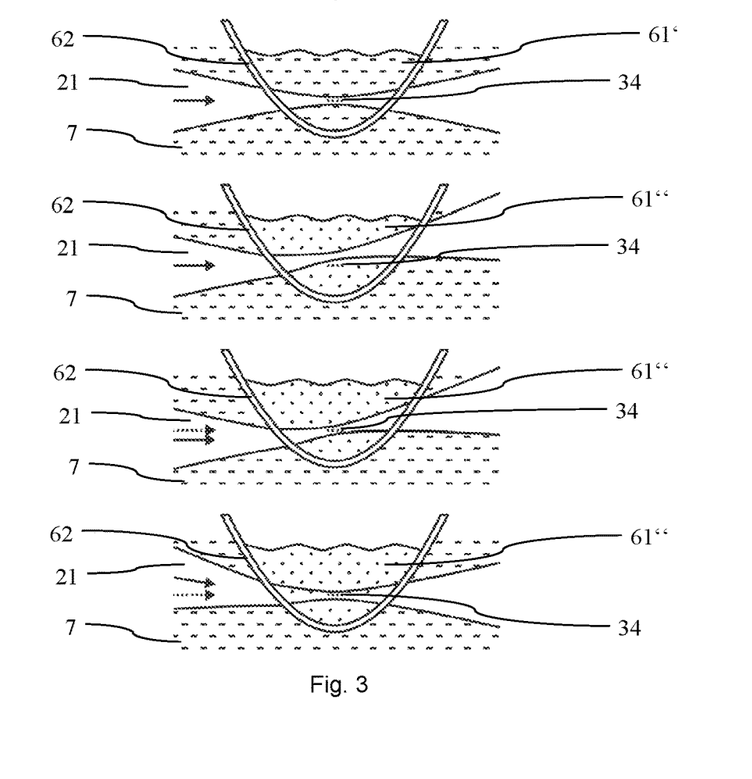
FIG. 3 shows a sequence of schematic representations illustrating alignment of an illumination light beam.

The sample medium 61 is illuminated by the illumination light beams 21 as shown in more detail in FIG. 3. In particular, as can be seen in the top illustration of FIG. 3, it is an aim that the sample medium 61 is illuminated in the imaging focal plane 34 of the imaging objective 3. Since in the top illustration the refractive indexes of the immersion medium 7, the transparent portion 62 of the sample holder 6 and the sample medium 61' are essentially the same the illumination light beams 21 can horizontally pass the sample holder 6 and the sample medium 61' even though it hits the sample holder 6 at a non-orthogonal or even sharp angle. The ARA 4 allows for moving the illumination light beams 21 along the detection axis 35 up and down, i.e. along a z-axis of a coordinate system shown in FIG. 2. The imaging focal plane 34 can likewise be moved along the detection axis 35 independently from the illumination light beams 21.

However, as can be seen in the second illustration from top of FIG. 3, in situations where the refractive indexes of the immersion medium 7 and the sample medium 61" differ, the illumination light beams 21 are deflected such that they do not horizontally pass the sample holder 6 in the imaging focal plane 34. This deteriorates the quality of the imaging. The deflection can be compensated by the following two correction mechanisms.

As can be seen in the third illustration from top of FIG. 3, the ARA 4 moves the illumination light beams 21 up and down along the detection axis 35, i.e. along the z-axis. Furthermore, as can be seen in the bottom illustration of FIG. 3, the ARA 4 rotates the illumination light beams 21 in a rotational plane in which the detection axis 35 lies, thereby adjusting the angle between the illumination light beams 21 and the outer surface of the sample holder 6. The rotational plane is parallel to a y-axis and the z-axis of the coordinate system of FIG. 2. In this way, the illumination light beams 21 can be manipulated such that they horizontally pass the sample holder 6 and the sample medium 61" in the imaging focal plane 34. Like this, the sample medium 61" can thoroughly be illuminated and imaged. This illustration of FIG. 3 shows illumination from one side only but, of course, equivalent applies for illumination from an opposite direction.

The microscope 1 can be operated as follows: The sample medium 61 arranged inside the sample holder 6 is illuminated with the illumination light beam 21 ejected along the illumination path 22 through the transparent portion 62 of the sample holder 6 by the illumination objective 2. The imaging objective 3 receives the detection light 31 comprising at least a portion of the light ejected by the sample medium 61, wherein the detection light 31 is propagated along a detection path which lies orthogonal to the illumination path 22 and which defines the detection axis 35. The ARA 4 displaces the illumination light beam 21 relative to the imaging focal plane 34 along the detection axis 35 (z-axis). The ARA 4 also rotationally displaces the illumination light beam 21 in the rotational plane (y-z-plane) in which the detection axis 35 lies. The displacement of the illumination light beam 21 relative to the imaging focal plane 34 is changed based on a position of the sample medium 61 or on a position of a portion thereof in the sample holder 6.

Thus, with the microscope 1 the sample medium 61 or the sample can be imaged by illuminating the sample medium 61 with the illumination light beam 21 ejected along the illumination path 22; the imaging objective 3 detecting light ejected from the sample medium 61 along the detection path 35 angled at 90° to the illumination path 22, wherein the detection light 31 comprises at least a portion of the light ejected from the sample medium 61; and displacing the illumination light beam 21 relative to the imaging focal plane 34 along the detection path 35. The displacement of the illumination light beam 21 relative to the imaging focal plane 34 is changed in accordance with changing positions of the sample medium 61. By displacing the illumination light beam 21 relative to the imaging focal plane 34, the illumination light beam 21 is brought in an alignment such that it intersects the imaging focal plane 34, wherein the sample medium 61 is imaged in a given position for a set of alignments of the illumination beam 21. Thereby, an image of the sample medium 61 is taken for each of the set of alignments of the illumination beam; the images taken are evaluated to determine best alignment parameters based on contrast or other image quality features for the given position of the sample medium 61; the best alignment parameters are stored; and the illumination light beam 21 is displaced in compliance with the stored best alignment parameters.

This description and the accompanying drawings that illustrate aspects and embodiments of the present invention should not be taken as limiting—the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the FIGS. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

What is claimed is:

1. A microscope for imaging a sample, comprising:
at least one illumination objective arranged to eject an illumination light beam along an illumination path to illuminate the sample;
an imaging objective arranged to receive detection light comprising at least a portion of the light ejected from the sample, wherein the detection light is propagated along a detection axis angled preferably at about 90° to the illumination path and wherein the imaging objective has an imaging focal plane;
a sample holder arranged to receive a sample and having a transparent portion which is transparent to the illumination light beam and to the detection light, wherein the transparent portion of the sample holder tapers along the detection axis into a rounded bottom, wherein the sample holder has an interior which is open in an upward direction, and wherein the imaging objective is positioned substantially below the sample holder;
a holder support arranged to receive the sample holder and to displace the sample holder relative to the imaging objective wherein the holder support has a drive system arranged to displace the sample holder; and
wherein the imaging objective is positioned to be directed essentially against a direction of gravity and the at least one illumination objective is positioned to be directed essentially perpendicular to the direction of gravity.

2. The microscope of claim 1, comprising a motorized and electronically controlled adjustment arrangement to linearly displace the illumination light beam and the imaging focal plane relative to each other along the detection axis.

3. The microscope of claim 1, wherein the drive system of the holder support is arranged to displace the sample holder along three perpendicular axes and/or to rotate the sample holder around at least one rotation axis.

4. The microscope of claim 2, comprising a further illumination objective arranged to eject a further illumination light beam along a further illumination path,
wherein the further illumination objective is arranged to eject the further illumination light beam substantially opposite to the illumination light beam.

5. The microscope of claim 4, comprising a further adjustment arrangement to linearly displace the further illumination light beam and the imaging focal plane relative to each other along the detection axis.

6. The microscope of claim 5, wherein the further adjustment arrangement is substantially identical to the adjustment arrangement.

7. The microscope of claim 5, wherein the further adjustment arrangement is configured to linearly displace the further illumination light beam and the imaging focal plane relative to each other along the detection axis independently from relative displacement between the illumination light beam and the imaging focal plane along the detection axis.

8. The microscope of claim 5, wherein the illumination objective and/or the further illumination objective and the imaging objective are configured to remain at respective fixed locations, and wherein the adjustment arrangement and/or the further adjustment arrangement are spatially offset from the objectives.

9. The microscope of claim 2, wherein the adjustment arrangement is located behind the illumination objective and determines a movement of the illumination light beam along the detection axis.

10. The microscope of claim 2, wherein the adjustment arrangement comprises at least one mirror.

11. The microscope of claim 10, wherein the at least one mirror is two mirrors that are arranged to move relative to each other in a way that an alignment of the illumination light beam is achieved based on a position of the transparent portion of the sample holder to be currently imaged.

12. The microscope of claim 10, comprising a rotative arrangement to rotationally displace the illumination light beam in a rotation plane defined by the detection axis and the illumination path.

13. The microscope of claim 12, wherein the rotative arrangement comprises at least one mirror.

14. The microscope of claim 13,
wherein the at least one mirror of the rotative arrangement corresponds to the at least one mirror of the adjustment arrangement, or
wherein the at least one mirror is two mirrors of the rotative arrangement that correspond to two mirrors of the adjustment arrangement.

15. The microscope of claim 4, wherein the further illumination objective is substantially identical to the illumination objective.

16. The microscope of claim 1, wherein the illumination objective and the imaging objective are placed in an immersion medium, and the transparent portion of the sample holder is made of a material which has a refractive index corresponding to a refractive index of the immersion medium.

17. The microscope of claim 16, wherein the immersion medium is water or a water solution and the transparent portion of the sample holder is a membrane made of fluorinated ethylene propylene.

18. The microscope of claim 16, wherein the sample comprises or is arranged in a sample medium having a refractive index different from the refractive index of the immersion medium.

* * * * *